MAGNETIC DEVICE FOR PERFORMING COMPLEX LOGIC FUNCTIONS

Filed Oct. 25, 1962 5 Sheets-Sheet 1

INVENTOR.
EUGENE T. WALENDZIEWICZ
BY Francis A. Varallo
AGENT

Feb. 15, 1966 E. T. WALENDZIEWICZ 3,235,718

MAGNETIC DEVICE FOR PERFORMING COMPLEX LOGIC FUNCTIONS

Filed Oct. 25, 1962 5 Sheets-Sheet 2

INVENTOR.
EUGENE T. WALENDZIEWICZ

BY Francis A. Varallo
AGENT

INVENTOR.
EUGENE T. WALENDZIEWICZ
BY
Francis A. Varallo
AGENT

INVENTOR.
EUGENE T. WALENDZIEWICZ
BY
Francis A. Varallo
AGENT

INVENTOR.
EUGENE T. WALENDZIEWICZ
BY
Francis A. Varallo
AGENT 3,235,718

MAGNETIC DEVICE FOR PERFORMING COMPLEX LOGIC FUNCTIONS

Eugene T. Walendziewicz, Philadelphia, Pa., assignor to Burroughs Corporation, Detroit, Mich., a corporation of Michigan Filed Oct. 25, 1962, Ser. No. 233,068
12 Claims. (Cl. 235—173)

This invention relates generally to magnetic devices nd more particularly to the use of such devices to perform complex logic functions.

The operation of data processing and computing equipment depends upon the performance of a variety of logical operations. The system requirements for such equipment generally place considerable emphasis on high reliability, compact size and weight, and low power consumption with rapid computational speed.

From the standpoint of reliability, magnetic devices and circuits are regarded as having a considerable advantage over other electronic components. In fact, magnetic elements have proved to be inherently more reliable than semiconductor devices and have failure rates which are significantly lower than semiconductors. The major disadvantages encountered heretofore in the use of magnetic elements in computing systems were that such systems were invariably characterized by slow computation and proportionately high power consumption.

The present invention is directed to a novel combination of high speed logic and comparatively slow speed magnetic elements. Although the invention has general utility in the performance of a variety of complex logical operations, its significance can be appreciated by considering the addition operation. As is well-known, addition is the most common operation in computing systems and is the basis for the other arithmetic operations such as subtraction, multiplication and division. The speed of the addition process, which directly affects the time required for the other operations, is in general limited by the time necessary for the "carries" generated, to propogate through the adder stages. In conventional electronic computers, carries ripple through the adders asynchronously and at a much faster rate than the basic clock frequency. In magnetic systems this is not possible because each distinct operation must be synchronized by the comparatively slow clock. As such, magnetic computers in the past have been limited to the computational speeds possible from a basically serial addition process.

In terms of logic, an extremely fast mode of computation results from parallel binary addition with simultaneous-carry. Mathematical equations for this type of addition have been known for some time. For example, these equations are found in the doctoral thesis of H. L. Garner, University of Michigan, dated 1958, and entitled "Error Checking and the Structures of Binary Addition." Although such equations existed, their use in the design of a practical computing system utilizing conventional electronic components was prohibitive since the mechanizing of the equations involved high component counts and interconnection complexities.

The present invention represents a break-through in this regard in that the implementation of parallel binary addition with simultaneous-carry by using magnetic elements was demonstrated to be both feasible and practical. By way of example and to emphasize the contribution to the computing art made by the present invention, the network for generating the simultaneous-carry terms for twenty-five bit numbers in transistor-diode logic would require approximately 351 transistors and 3,276 diodes. In contrast, the same logic function can be implemented in accordance with the teachings of the invention by utilizing a total of 325 magnetic cores suitably positioned along a common bundle of 50 input, 25 output and 2 control lines.

It is therefore an object of the present invention to provide means for performing complex logical operations which are characterized by reliability, high computational speed, economy of components and moderate power requirements.

These and other features of the invention will become more fully apparent from the following description of the annexed drawings wherein.

Figure 1:
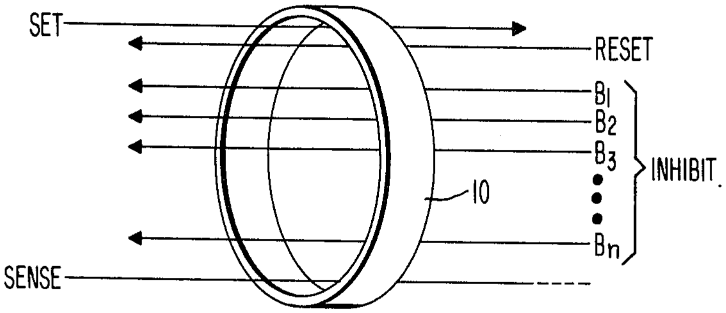
FIG. 1 illustrates a magnetic core and associated control lines representing the basic unit employed in the practice of the present invention.

Considering the basic magnetic element depicted in FIG. 1, such element appears in the shape of a toroid, but it should be understood that the invention is not limited to elements of this particular geometry, but may include other forms of magnetic storage elements. The magnetic core of FIG. 1 and all the cores discussed hereinafter are assumed to have substantially rectangular hysteresis loop characteristics. Cores having these properties are capable of being rapidly switched from one of two possible conditions of magnetization to the other condition by a magnetizing force exerted by associated electrical windings. These cores additionally are capable of remaining in their last assumed magnetic condition after the force which caused the condition has subsided. Information of opposite polarities to be stored in the magnetic elements is arbitrarily designated in the binary notation "1" and "0," or "SET" and "RESET" respectively.

The implementation of complex logic by such magnetic elements involves a "null decoder function," or stated another way, each magnetic element becomes a "core null decoder."

The conventional coincidence decoder or AND-gate satisfies the following logical expression:

$$A_1A_2A_3 \ldots A_{n-1}A_n$$

Consider the logic rule represented by De Morgan's theorem $CD=\overline{\overline{C}+\overline{D}}$, where in Boolean notation, the line over a symbol represents the NOT function, the addition sign means OR, and the positioning of symbols side-by-side or separated from each other by a dot or multiplication sign, signifies AND. The line over a group of symbols means that the NOT function applies to the entire expression under the line.

Be repeated application of De Morgan's theorem it is possible to convert the logic expression for a coincidence decoder as given hereinbefore, to a form suitable for use with an anti-coincidence device, $$\overline{B_1+B_2+B_3+\cdots+B_n}$$

where $B_i=\overline{A}$.

The use of a magnetic core in the anti-coincidence mode of operation is illustrated in FIG. 1. Each of the SET, RESET and INHIBIT lines is adapted to be pulsed from a source of current which has not been illustrated in FIG. 1. It is assumed that the core 10 is originally in the RESET state. At time $T_1$, the SET line as well as all the INHIBIT lines for which the corresponding input variables are "true," that is $B_i=1$, are enabled. Each enabled line carries current of sufficient amplitude to switch the core. Under these conditions, the core will be switched to the SET or "1" state if, and only if, none of the INHIBIT lines are enabled. That is, provided that the following logical expression is satisfied:

$$\overline{B_1+B_2+B_3+\cdots+B_n}=\overline{B}_1\overline{B}_2\overline{B}_3\cdots\overline{B}_n=1$$

At a later time $T_2$, the RESET line is enabled and if the core had been set at time $T_1$, it is switched back to the RESET or "0" state. The switching of the core causes a signal voltage to be induced in the SENSE line.

The SET, RESET, INHIBIT and SENSE lines either thread or by-pass the magnetic cores in accordance with the logical operation to be performed. Obviously these lines affect or are affected by only those cores through which they thread.

The expression "core null decoder" is aptly descriptive of the magnetic element hereinbefore described when such element is used to perform logical operations. This is true because first, the magnetic element requires the absence of current pulses on all inhibit variable lines in order to switch from one remanent state to its opposite remanent state, and second, the device behaves as an AND gate when its input variables are inverted.

The same SENSE line can thread several core null decoders, thereby acting as an OR gate or mixer for the output signals derived from the cores. In this manner a group of cores and a single sense line can be used to implement a logic equation of the form:

$$S=A_1A_2A_3\ldots A_n+B_1B_2B_3\ldots B_n+\ldots+C_1C_2C_3\ldots C_n$$

An important feature of this magnetic logic technique is the extensive "fan-in" and "fan-out" capability that it offers. Specifically, an input INHIBIT line or an output SENSE line can readily be threaded serially through several hundred core null decoders. Similarly, any single core null decoder can be threaded by about a hundred INHIBIT or SENSE lines, or a combination of the two. The result is that relatively simple AND gates and OR gates are available which can handle at least an order of magnitude greater number of input variables than are usually handled. The same relative extension applies to the "fan-out" configuration. The logic structures of the present invention which advantageously use these new and greatly extended capabilities are hereinafter described in detail.

The same core null decoder can be threaded by several SENSE lines to generate a word, whenever the core is switched to the SET state and back to its RESET state, as in the case of a fixed memory. This last application has been reported by R. Alonso and J. H. Laning, Jr. of the Massachusetts Institute of Technology in a paper entitled "Design Principles for a General Control Computer," dated April 1960. In this paper the magnetic elements and associated control wiring are collectively referred to as a "core rope." The authors state that "The term 'core rope' is used to denote the device used as the wired-in or 'fixed' storage for this computer and as the selection switch controlling operation of the volatile or 'erasable' storage."

No mention is found in this report of the utilization of magnetic cores as null decoders to implement complex logic functions. The techniques associated with the use of magnetic elements for the latter functions are unique and form the basis of the present invention.

In order to better appreciate the nature of the invention as it applies to binary addition with simultaneous carry, derivation of the addition equations will now be considered in detail.

From the truth table for a single bit full adder stage, it is possible to obtain Boolean expressions for the sum and carry for that stage, $S_i$ and $C_{i+1}$, respectively:

$$S_i=A_i\overline{B}_i\overline{C}_i+\overline{A}_iB_i\overline{C}_i+\overline{A}_i\overline{B}_iC_i+A_iB_iC_i \quad (1)$$

$$C_{i+1}=\overline{A}_iB_iC_i+A_i\overline{B}_iC_i+A_iB_i\overline{C}_i+A_iB_iC_i \quad (2)$$

where $A_i$ and $B_i$ are the $i^{th}$ terms of the addend and augent numbers respectively while $C_i$ is the carry *into* the $i^{th}$ adder stage. Through standard logic operations Equations (1) and (2) can be reduced to the forms most useful in this discussion. It should be noted that "+" implies an "inclusive-OR," and "⊕," an "exclusive-OR."

$$S_i=A_i\oplus B_i\oplus C_i \quad (3)$$

$$C_{i+1}=(A_i\oplus B_i)C_i\oplus A_iB_i \quad (4a)$$

$$C_{i+1}=(A_i\oplus B_i)C_i+A_iB_i \quad (4b)$$

Let two new variables $R_i$ and $K_i$ be defined as follows:

$$R_i=A_i\oplus B_i \quad (5)$$

$$K_i=A_iB_i \quad (6)$$

Equations (3), (4a) and (4b) can now be rewritten as:

$$S_i=R_i\oplus C_i \quad (7)$$

$$C_{i+1}=R_iC_i\oplus K_i \quad (8a)$$

$$C_{i+1}=R_iC_i+K_i \quad (8b)$$

In choosing constraints to be placed on the addend and augend terms, consideration is given to the problems involved in subtraction as well as addition. With the constraints as defined below, it is possible to "mathematically" insert a carry into the lowest stage of the adder through the special $A_0$ and $B_0$ terms introduced only for this purpose:

$$A_i=B_i=0 \quad \text{for } i\neq 0, 1, 2, \ldots, n \quad (9)$$

$$A_i=B_i \quad \text{for } i=0 \quad (10)$$

By iteratively solving Equation (8a), a set of independent, single logic-level equations for the carry terms results:

$$C_1=K_0$$

$$C_2=K_0R_1\oplus K_1$$

$$C_3=K_0R_1R_2\oplus K_1R_2\oplus K_2$$

*

*

$$C_i=K_0R_1R_2\ldots R_{i-1}\oplus K_1R_2R_3\ldots R_{i-1}\oplus\ldots\oplus K_{i-1} \quad (11a)$$

*

*

$$C_{n+1}=K_0R_1R_2\ldots R_n\oplus K_1R_2R_3\ldots R_n\oplus\ldots K_{n-1}R_n\oplus K_n$$

while a similar set of simultaneous equations is obtained from the iterative solution of (8b), the general form of which is:

$$C_i=K_0R_1R_2\ldots R_{i-1}+K_1R_2R_3\ldots R_{i-1}+\ldots+K_{i-1} \quad (11b)$$

It is now a relatively straight forward operation to transform the set of equations characterized by (11a)

to an equivalent expression in binary matrix algebra notation:

$$\begin{bmatrix} C_1 \\ C_2 \\ C_3 \\ C_4 \\ * \\ * \\ C_n \\ C_{n+1} \end{bmatrix} = \begin{bmatrix} 1 & 0 & 0 & 0 & 0 & 0 \\ R_1 & 1 & 0 & 0 & 0 & 0 \\ R_1R_2 & R_2 & 1 & 0 & 0 & 0 \\ R_1R_2R_3 & R_2R_3 & R_3 & 1 & 0 & 0 \\ * & * & & & * & * \\ * & * & & & * & * \\ R_1R_2 \ldots R_{n-1} & R_2R_3 \ldots R_{n-1} & * & * & 1 & 0 \\ R_1R_2 \ldots R_n & R_2R_3 \ldots R_n & * & * & R_n & 1 \end{bmatrix} \begin{bmatrix} K_0 \\ K_1 \\ K_2 \\ K_3 \\ * \\ * \\ K_{n-1} \\ K_n \end{bmatrix} \quad (12)$$

which can also be represented in an abbreviated form as $$[C_{i1}]=[f_{ij}(R)][K_{i1,1}] \text{ for } i=1, 2, 3, \ldots, n+1 \text{ and } j=1, 2, 3, \ldots, n+1 \quad (13)$$

Here the vectors are handled like single-row or single-column matrices, while matrix multiplication and addition are performed in the conventional manner.

This matrix notation is very useful because of the direct correspondence between the equations of addition in this form and the operation of the arithmetic unit to be described later. In order to complete the set, equivalent matrix expressions for Equations (5), (6) and (7) respectively are presented:

$$\begin{bmatrix} R_1 \\ R_2 \\ R_3 \\ * \\ * \\ R_{n-1} \\ R_n \end{bmatrix} = \begin{bmatrix} A_1 \\ A_2 \\ A_3 \\ * \\ * \\ A_{n-1} \\ A_n \end{bmatrix} \oplus \begin{bmatrix} B_1 \\ B_2 \\ B_3 \\ * \\ * \\ B_{n-1} \\ B_n \end{bmatrix} \quad (14)$$

or $$[R_{i1}] = [A_{i1}] \oplus [B_{i1}] \text{ for } i=1, 2, \ldots, n \quad (15)$$

and $$\begin{bmatrix} K_0 \\ K_1 \\ K_2 \\ * \\ * \\ K_{n-1} \\ K_n \end{bmatrix} = \begin{bmatrix} A_0 \\ A_1 \\ A_2 \\ * \\ * \\ A_{n-1} \\ A_n \end{bmatrix} [1 \quad 1 \quad 1 \quad * \quad * \quad 1 \quad 1] \begin{bmatrix} B_0 \\ B_1 \\ B_2 \\ * \\ * \\ B_{n-1} \\ B_n \end{bmatrix} \quad (16)$$

or $$[K_{i1}]=[A_{i1}][f_{0j}(1)][B_{i1}] \text{ for } i=0, 1, \ldots, n \text{ and } j=1, 2, \ldots, n+1 \quad (17)$$

and, similarly for the sum $$\begin{bmatrix} S_1 \\ S_2 \\ S_3 \\ * \\ * \\ S_n \\ S_{n+1} \end{bmatrix} = \begin{bmatrix} R_1 \\ R_2 \\ R_3 \\ * \\ * \\ R_n \\ 0 \end{bmatrix} \oplus \begin{bmatrix} C_1 \\ C_2 \\ C_3 \\ * \\ * \\ C_n \\ C_{n+1} \end{bmatrix} \quad (18)$$

or $$[S_{i1}] = [R_{i1}] \oplus [C_{i1}] \text{ for } i=1, 2, \ldots, n+1 \quad (19)$$

The final equation to be introduced here is the one for determining the integer magnitude of a binary number given its vector representation, and vice versa:

$$[N_{i1}] \leftrightarrows \Sigma N2^{i-1} \quad \text{for } i=1, 2, \ldots, n, n+1 \quad (20)$$

In the derivation of the addition equations, an alternate form for the carry equations was developed which uses an inclusive-OR operator between the decoder terms. While the exclusive-OR form (11a) is preferred for incorporation into the matrix algebra notation, the inclusive-OR form (11b) is easier to visualize in terms of the physical components needed for mechanization of the technique. As can readily be verified by inspection, it is never possible for more than one decoder term to be satisfied in (11a) or (11b) as a consequence of the particular definitions for $R_i$ and $K_i$:

$$R_iK_i=0 \quad (21)$$

Hence, either the inclusive-OR or the exclusive-OR operator would yield the same result.

Thus far we have derived the equations for true parallel addition. In order to mechanize these equations and perform the required arithmetic operation, two distinct groups of memory-like registers are used. These groups are called data and matrix-type registers respectively, and will be considered hereafter in greater detail. Arithmetic operations are performed as data is transferred in parallel between registers that are members of the two groups. Each register performs a unique logical operation upon the information present on its input channels when and if it is placed in the set condition. The results of that operation are stored in the register until receipt of a reset command from the control logic, at which time the elements of the register are cleared and the information is made available on the input channels of registers in the other group.

The particular operation performed during a transfer time depends upon which registers are simultaneously being set or reset. The particular manner in which a register is wired determines the function that it performs. It is possible to develop a complete and rather elaborate order code with relatively few distinct registers and transfer channels. Instructions are implemented as a series of controlled transfers between these registers.

Before considering the actual parallel addition algorithm it is well to define what is meant by data and matrix registers.

The data registers are somewhat analogous to the gated flip-flop registers found in the conventional arithmetic unit. The individual stages of these registers are adapted to receive only a few input variables. This is in sharp contrast to the elements of the matrix registers which are designed to accept large numbers of inputs. The data registers perform only relatively simple operations on corresponding terms of two parallel channels of information, which may arbitrarily be defined as the A and B channels respectively. For example, such operations may include the logical AND, exclusive-OR or identity function. Information may be stored, undisturbed, in data registers, for periods comprising many clock cycles. When cleared of information, these registers provide output signals to trigger inhibit current drivers, which in turn provide the input signals to the matrix registers. The input signals to the data registers come from the sense amplifiers on the output side of the matrix registers, thereby completing a loop for the transfer of information between the data and matrix registers.

Matrix-type, or simply matrix registers, are not restricted to the simple manipulation of a single vector or operation between corresponding elements of two vectors, as are the data registers. The matrix registers may utilize many core null decoders, and in accordance with the present invention can perform complex logical operations which are expressable in terms of one logic level. A logic level is defined as an AND operation, followed by an OR logical operation. The input variable lines to the matrix registers come from the data registers.

Figure 2:
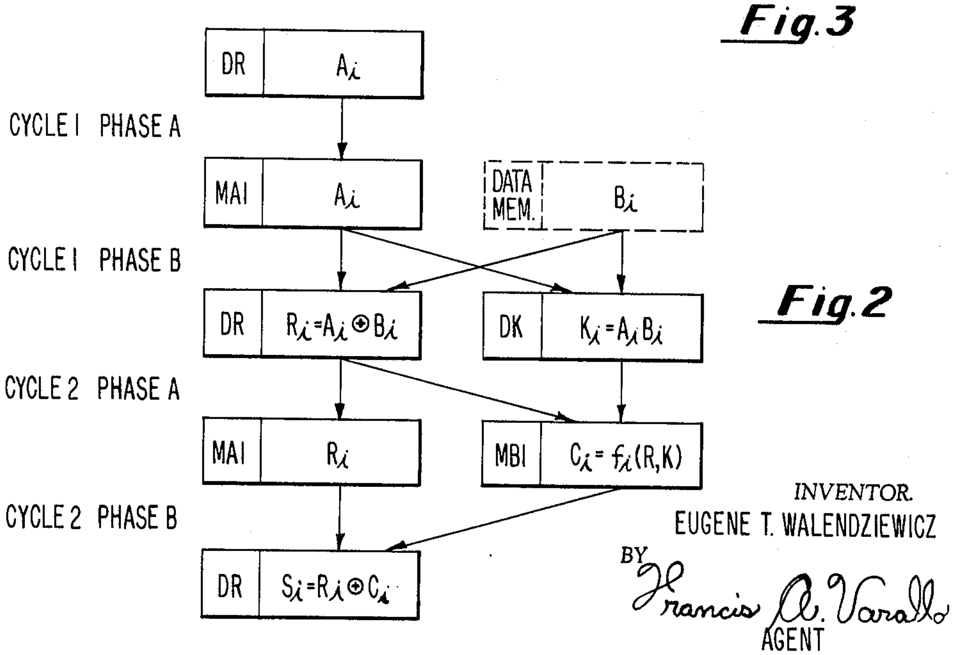
FIG. 2 is a diagrammatic representation of a parallel binary addition process performed in accordance with the teachings of the present invention and designated as Method I.

With specific reference to FIG. 2, there is depicted in block form one method for fully parallel binary addition made possible by the present invention. The blocks represent either data or matrix registers, and the transfer lines represent the flow of data between registers. The equations which are written within the blocks represent the operation performed by the block or the information that is being stored therein. The function performed by each of the various registers is as follows:

DR Data Register—exclusive OR between the corresponding bits of two input channels of information. The equivalent matrix algebra notation for this operation is given by Equation (15).

DK Data Register—a logical AND between the corresponding bits of two input channels of information. In this case the equivalent matrix notation is given by Equation (17).

MA1 Matrix Register—accepts and buffers the information present on the input transfer channel from the DR register upon receipt of a SET command from the control logic. The notation for this operation is simply $$[B_{i1}]=[R_{i1}]$$

MB1 Matrix Register—accepts, decodes and buffers the information present on the two transfer channels from the DR and DK data registers during the SET time. At reset of the MB1 register, these decoder cores are cleared and their outputs are mixed by sense lines as required. The resultant simultaneous-carry vector is presented to the data registers through the "B" transfer channel. The equivalent matrix algebra notation for this operation is given by Equations (12) or (13). The most important member of this group of registers, and the key element of the arithmetic operation is the MB1—the simultaneous-carry register.

Consider the matrix Equation (12) for the simultaneous-carry terms. Each non-zero element in the matrix array $[f_{ij}(R)]$ can be physically implemented with a core null decoder threaded by the proper $\overline{R}_i$ inhibit lines. It should be recalled that anti-coincidence decoders require inverted input signals. For 24 input variables, 325 such cores are required. The matrix multiplication operation is now implemented by threading all cores corresponding to elements in the $i^{th}$ column of the array by the $\overline{K}_{i-1}$ inhibit line. Separate sense lines corresponding to the simultaneous-carry terms thread the core corresponding to the elements in each separate row of the array. An inclusive-OR operation is performed on the outputs of the cores for each row as is allowed by Equation (11b). All the 325 cores are threaded by the same set and reset control lines.

It should now be apparent why the matrix register is so named. Obviously, its mode of operation is similar to that of the matrix algebra which it is effectively implementing. As compared with the operation of a single core null decoder described hereinbefore, and by way of the example chosen for purposes of description, at times $T_1$, two 25-line channels of input inhibit lines, corresponding to the half-add sum and the half-add carry binary vectors, and the common set line are enabled. As many as twenty-five of the core null decoders could be satisfied and, as a result, placed in the "1" state. At time $T_2$, the reset line is enabled, switching back to the original "0" state any of the cores which had been previously set, and the simultaneous carry vector terms appear in parallel on the 25-sense lines of the output channel.

Alternately, the implementation of the carry vector may be appreciated by examining the set of simultaneous equations obtained from the iterative solution of Equation (8b), the general form of which is given by Equation (11b) thus:

$$C_i=K_0\ R_1\ R_2\ .\ .\ .\ R_{i-1} + K_1\ R_2\ R_3\ .\ .\ .\ R_{i-1} + \ .\ .\ .\ + K_{i-1}$$

Each term on the right of the equation is represented by a core null decoder through which are threaded drive lines from the DK and DR data registers as required. The logical OR of the decoder terms in each set of equations is accomplished by threading the same sense line through all cores representing terms in the particular equation for $C_i$, thereby requiring as many separate sense lines as there are carry terms.

Addition is accomplished by the various registers by first forming a parallel half-add sum and carry from the addend and augend numbers. Then the simultaneous carry number is generated based on the two results of the first step. Lastly, the half-add sum of the addend and augend numbers is again half-added to the simultaneous carry number forming the algebraic sum of the original addend and augend numbers.

With further reference to FIG. 2, the addition operation is performed specifically as follows. It will be assumed that the addend, represented by the vector $[A_{i1}]$ was left in the DR data register at the end of some previous instruction, while the augend $[B_{i1}]$ is stored in some specific location of the data memory. The addition of these two numbers can be accomplished in two clock cycles—each cycle having two phases, Phase A and Phase B. Stated another way, the operation to be described is accomplished at four transfer times.

During clock cycle 1, Phase A, the DR data register is reset and matrix register MA1, which buffers the DR register, is set. The $A_i$ information is transferred to the MA1 matrix register, "1's" remaining in the DR register. During that same time period a core corresponding to the memory location of the augend terms $B_i$ is set, in preparation for read-out during the next transfer time. At Phase B of clock cycle 1, the MA1 matrix register containing the $A_i$ terms and the data memory location for the $B_i$ terms are simultaneously cleared or reset, and information is transferred back to two data registers, DK and DR respectively. The DK register performs a logical product or AND function of the $A_i$ and $B_i$ terms, term-by-term, thereby generating the K function vector. The DR register does a term-by-term exclusive-OR or a modulo-2 addition operation on the addend and augend terms, resulting in the R function vector. Thus:

$$[R_{i1}]=[A_{i1}]\oplus[B_{i1}]$$
$$[K_{i1}]=[A_{i1}][f_{0j}(1)][B_{i1}]$$

In practice the register for generating the $R_i$ terms would probably be the same register as that in which the $A_i$ terms were originally stored. The function of the DR register is quite similar to that of the accumulator register in a conventional arithmetic unit.

During clock cycle 2, Phase A, the DK and DR data registers are reset while the MB1 matrix register, which performs a simultaneous carry upon the R and K terms, is set as well as MA1, matrix buffer register for the $R_i$ terms. This may be represented as:

$$[C_{i1}]=[f_{ij}(R)][K_{i-1,\,1}]$$
$$[R_{i1}]\rightarrow[MA1]$$

During Phase B of clock cycle 2, the MB1 carry matrix register and the MA1 buffer matrix register are both reset while the DR data register which performs an exclusive-OR of the two channels of information being presented to it, is set. The result appearing in the DR data register, accumulator, is the sum or $S_i$ terms, and the execution of the addition instruction is complete. Expressed in terms of the abbreviated form of matrix notation: $[S_{i1}]=[R_{i1}]\oplus[C_{i1}]$. As indicated hereinbefore, the data register, DR, which originally contained the addend or $A_i$ terms performs the exclusive-OR of the addend and augend terms to obtain $R_i$, and later performs the exclusive-OR of the $R_i$ and $C_i$ terms to obtain the sum $S_i$ terms, may be one and the same register.

Summarily, in terms of the time expended the addition instruction described required two two-phase clock periods or assuming a 100 kc. clock, 20 microseconds to complete. The full instructions, including memory access and overflow detection, takes approximately 30 microseconds. In terms of equipment needed to mechanize the addition process, included are two data registers, one performing an exclusive-OR, the other a logical AND; and two matrix registers, one for buffering a data register and another for peforming the simultaneous carry.

Figure 3:
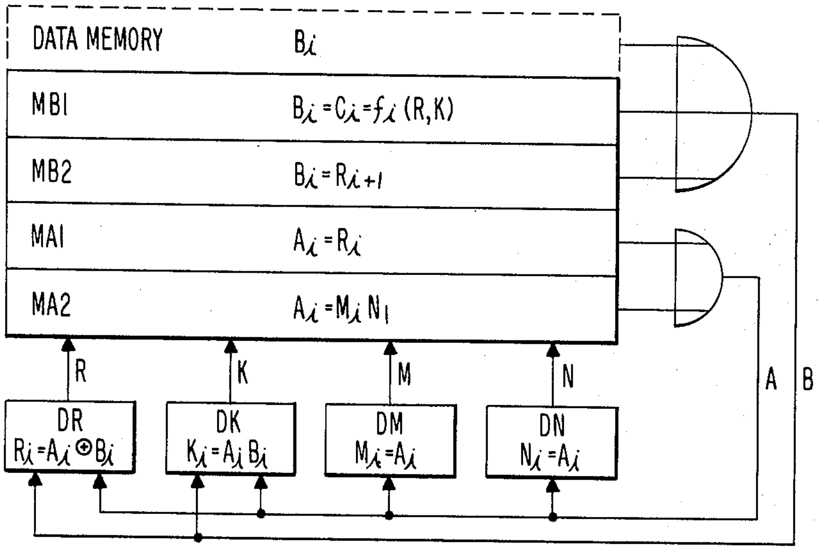
FIG. 3 represents in block form the system organization of an arithmetic unit assembled in accordance with Method I.

FIG. 3 is a block diagram of a representative arithmetic unit. It will be noted that the diagram depicts the two data registers, DR and DK and the two matrix registers MA1 and MB1, as well as the four transfer channels—all of which are utilized in the addition process described herein.

Additionally, two other data registers, DM and DN, and two matrix registers MA2 and MB2 are shown. The function of each of these registers is as follows:

DM Data Register—accepts and buffers information received from one input channel, providing a regenerative type of readout upon "reset."

$$[M_{i1}]=[A_{i1}] \text{ initially}$$
$$[M'_{i1}]=[M_{i1}] \text{ regenerative reset}$$

This register was devised to store the multiplicand during multiplication.

DN Data Register—accepts and buffers information received from one input channel, providing regeneration with a shift right of one bit position upon "reset."

$$[N_{i1}]=[A_{i1}] \text{ initially}$$
$$[N'_{i1}]=[N_{i+1,1}] \text{ regenerative reset}$$

MA2 Matrix Register—accepts and buffers the product of the vector present on the input transfer channel from the DM register and the lowest order element of the vector present on the transfer channel from the DN register. The equation for this operation is:

$$[A_{i1}]=[M_{i1}][M_{11}]$$

MB2 Matrix Register—accepts and buffers the information present on the input transfer channel from the DR register, shifted right one bit position. Thus, $$[B_{i1}]=[R_{i+1,1}]$$

Registers DM, DN, MA2 and MB2 are concerned with multiplication and will be considered hereinafter in greater detail.

Figure 4:
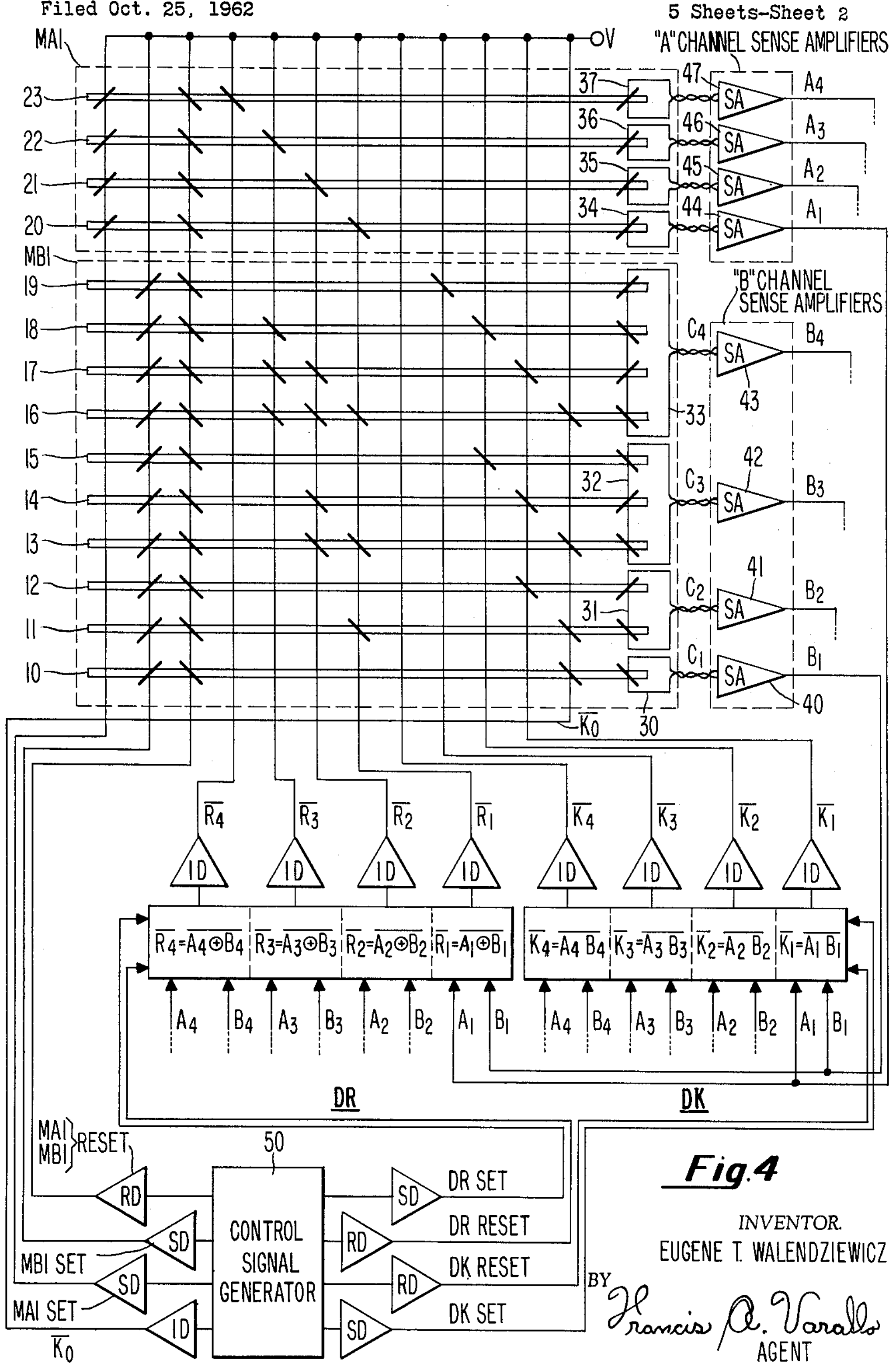
FIG. 4 is a schematic-like wiring diagram based on the method illustrated in FIG. 2 and FIG. 3.

Returning again to the addition process previously described, FIG. 4 is a schematic-like diagram based on FIGS. 2 and 3 and illustrates clearly the actual wiring configuration of the core null decoders and the interconnections between data and matrix registers for a sample four bit adder. As such the following description of FIG. 4 concentrates on the mechanical aspects of the invention. However similar notations and identifications of structures have been used in the description of the invention in connection with FIGS. 2 and 3 and such description applies equally well to FIG. 4 and may be read thereon.

In FIG. 4 there are depicted 14 core null decoders, 10–23, inclusive, each of which is represented as a narrow rectangular ribbon. Cores 10–19, inclusive, comprise the MB1 carry matrix register. The DK and DR data registers are represented as functional blocks. It should be noted that the function of the data registers, namely the generation of the inverse AND and the inverse exclusive-OR may be performed by various means either electronic or magnetic, and the present invention is not considered limited to any one of these means. For example, certain basic magnetic logic elements, such as the NOT, exclusive-OR and AND, applicable to the DR and DK registers of the present invention, are described in Chapter 10, pp. 161–166 inclusive of "Digital Applications of Magnetic Devices," edited by Albert J. Meyerhoff et al.

The output signals from the data registers trigger inhibit drivers (ID) which supply the input signals to the bundle of input wires which terminate at a source of supply potential, V. The slanted line at the intersection of a core and a wire indicates that the wire in question threads the core. The direction of the slant relative to the current in the wire indicates the direction of threading.

The control signal generator 50 functions to implement the control logic and provides the timing for the arithmetic operation. Signals from the control generator actuate appropriate current drivers (SD) and (RD) which provide current pulses in a direction to set the individual groups of cores associated respectively with the MA1 and MB1 registers, and also to reset all the cores. The respective setting or resetting of the DR and DK registers is under the control of the signal generator. Additionally, when required by the system logic, the generator actuates the inhibit driver associated with line $\overline{K}_0$.

An output signal derived from the resetting of each of the cores induces a voltage in the sense lines which are inductively coupled thereto. It is noted that in the case of the carry matrix register MB1, several of the sense lines thread more than one core, thereby acting as an OR gate or mixer for the output signals derived from the cores. When a sense line threads more than one core, its direction of winding is reversed in successive cores so as to provide a degree of noise cancellation during the read-out or reset of the cores.

The output of each sense line is connected to a sense amplifier—the sense amplifiers associated with the MA1 register providing the "A" channel of information, and those associated with the MB1 register, the "B" channel. Information from these channels is fed to corresponding sections of the DR and DK registers, thereby completing the loop.

The technique of wiring the core null decoders can best be illustrated by considering the MB1 register as shown in FIG. 4. The equations for the simultaneous carry terms have the general form given in (11a) or (11b), and have been expressed in the binary matrix algebra notation 12. The equations for the first four carry terms, using the form (11b) are as follows:

$$\begin{aligned} C_1&=K_0\\ C_2&=K_0R_1+K_1\\ C_3&=K_0R_1R_2+K_1R_2+K_2\\ C_4&=K_0R_1R_2R_3+K_1R_2R_3+K_2R_3+K_3 \end{aligned} \qquad (11b')$$

Keeping in mind that anti-coincidence decoders as described herein require inverted input signals, it is, however, more convenient and perhaps more understandable to refer to these decoders in the succeeding description as if they were of the usual coincidence type. In practice the core null decoders actually do require inverted signals on the input inhibit lines, as for example, $\overline{K}_1$, $\overline{K}_2$, or $\overline{R}_3$, $\overline{R}_4$, etc. Likewise, the data registers are described as if they generate the function itself rather than the inverse function, although in practice the latter is required.

Consider the first carry term $C_1$ in the Equations (11b′) derived above from (11b). This equation has only one term on the right, namely $K_0$. As mentioned previously, each term on the right of the equation is represented by a core null decoder. Core 10 represents this single term to the right, and the $\overline{K}_0$ line, emanating from the control signal generator 50 by way of an inhibit driver, threads core 10 in a direction such that current passing therethrough tends to reset the core. This action is of course true for all of the other inhibit lines which thread the cores.

The second carry term $C_2$ has two terms on the right represented respectively by cores 11 and 12. The first term $K_0R_1$ is implemented by threading the $\overline{K}_0$ and the $\overline{R}_1$ line through core 11. The $K_1$ term appears as the $\overline{K}_1$ line threads core 12. A common sense line 31 corresponding to the $C_2$ carry term threads cores 11 and 12, thereby providing the inclusive-OR operation on the outputs of these decoder terms. Considering the equation for $C_3$, each term on the right is implemented as follows:

$K_0R_1R_2$—core 13 is threaded by $\overline{K}_0$, $\overline{R}_1$ and $\overline{R}_2$;
$K_1R_2$—core 14 is threaded by $\overline{K}_1$ and $\overline{R}_2$;
$K_2$—core 15 is threaded by $\overline{K}_2$;
$C_4$ is similarly mechanized:

$K_0R_1R_2R_3$—decoder core 16 is threaded by $\overline{K}_0$, $\overline{R}_1$, $\overline{R}_2$, $\overline{R}_3$;
$K_1R_2R_3$—decoder core 17, threaded by $\overline{K}_1$, $\overline{R}_2$, $\overline{R}_3$;
$K_2R_3$—core 18, threaded by $\overline{K}_2$, $\overline{R}_3$, and
$K_3$—core 19, threaded by $\overline{K}_3$.

The carry terms appear respectively as the signal outputs of sense lines 30, 31, 32 and 33. The sense signals drive respectively sense amplifiers 40, 41, 42 and 43 whose outputs become the $B_1$, $B_2$, $B_3$ and $B_4$ vector terms applied to both DK and DR data registers.

The wiring of the MA1 register is similar to that of the MB1 but is somewhat simpler in that each term $\overline{R}_1$, $\overline{R}_2$, $\overline{R}_3$ and $\overline{R}_4$ of the DR register is buffered therein and each of these inhibit lines threads one of the cores of the MA1 register. Thus lines $\overline{R}_1$ through $\overline{R}_4$ thread cores 20 through 23 respectively. The outputs of these last cores are sensed by sense lines 34, 35, 36 and 37, which drive sense amplifiers 44, 45, 46 and 47 respectively. The outputs of this latter group of sense amplifiers are the $A_1$ through $A_4$ vector terms applied to the DR and DK registers.

Figure 5:
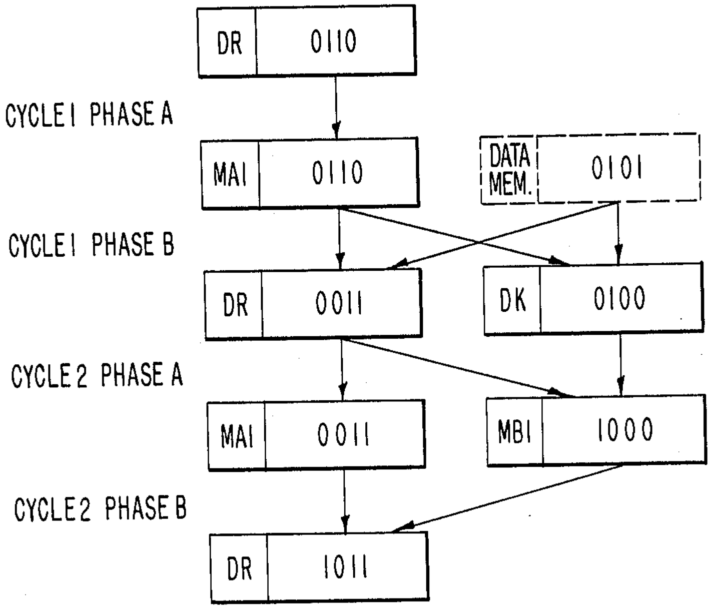
FIG. 5 illustrates the addition of two specific binary numbers in accordance with Method I operation.

FIGURE 5 has the same form as the block diagram of the Method I addition process of FIG. 2. FIG. 5 illustrates the addition of two binary numbers, namely, 0110 and 0101, to form the sum 1011, and shows the nature of the information stored in the various registers at different phases of the operational cycles. During the following description, reference should also be made to the general addition operation described hereinbefore with the aid of FIG. 2.

With specific reference to FIGS. 4 and 5, the addition of the two binary numbers 0110 and 0101 is as follows:

Clock Cycle 1, Phase A—It is assumed that all the cores 10–23, inclusive, are initially in the reset state. It is further assumed that the addend, binary number 0110, is stored in the DR register, and that the augend 0101 is stored in the data memory. The control signal generator 50 actuates the DR reset driver, which reads out the DR data register. In keeping with the anti-coincidence mode of decoding, it will be assumed for purposes of explanation that in the read-out or resetting of either the DK or DR registers, there results an output signal from each of those sections of the register which store a "0," and no appreciable voltage output from those sections storing "1's." Concurrently, the signal generator pulses the MA1 set driver. The read-out of the information stored in DR actuates the inhibit drivers for lines $\overline{R}_1$ and $\overline{R}_4$. Lines $\overline{R}_2$ and $\overline{R}_3$ remain inactive. Under these conditions current flow in lines $\overline{R}_1$ and $\overline{R}_4$ inhibits the setting of cores 20 and 23. Only cores 21 and 22 of the MA1 matrix register are set.

Clock Cycle 1, Phase B—The control signal generator then actuates the MA1 reset driver and also causes the augend to be read out of the data memory. Cores 21 and 22 are switched to the reset state, thereby inducing voltages in sense lines 35 and 36. These voltages are in turn transferred by sense amplifiers 45 and 46 as $A_2$ and $A_3$ to the DR and DK registers. The absence of switching signals from cores 20 and 23 cause lines $A_1$ and $A_4$ to remain inactive. The $B_i$ terms from the memory and the $A_i$ from the MA1 register are read concurrently into the DR and DK registers. The DK register performs a logical AND so that the information stored therein becomes 0100; and the DR register performs an exclusive-OR thereby storing 0011.

Clock Cycle 2, Phase A—The control signal generator causes DK and DR to be reset, and concurrently supplies a set signal to all of the core null decoders of both MA1 and MB1. Thus inhibit lines $\overline{K}_1$, $\overline{K}_2$, $\overline{K}_4$, and $\overline{R}_3$, $\overline{R}_4$ are actuated. Also inhibit $\overline{K}_0$ is enabled by the control signal generator. In practice $\overline{K}_0$ is always enabled during this phase of the addition process. During subtraction, however, the one's complement of the subtrahend is added to the minuend with the $\overline{K}_0$ line not enabled, thereby resulting in a carry being inserted into the lowest adder storage as is required by the two's complement arithmetic employed in an operative embodiment of the present invention. It will be noted that under these conditions only one core in the MB1 register will be set, carry core 19—all the other cores in the register remaining in the reset state. Also, cores 20 and 21 will be set in the MA1 register. The information stored in the MA1 at this time is 0011, and 1000 is stored in MB1.

Clock Cycle 2, Phase B—Upon command of the control generator 50, MA1 and MB1 are reset—the information on the "A" channel from MA1 being $A_1=1$, $A_2=1$, $A_3=0$, $A_4=0$; and on the "B" channel from MB1, $B_1=0$, $B_2=0$, $B_3=0$, $B_4=1$. This information is fed concurrently to the DR register which is set by the control generator. The DR register performs an exclusive-OR on the information from the A and B channels, and the resultant data in DR is 1011, the sum of the original addend and augend. The addition process is complete.

Figure 6:
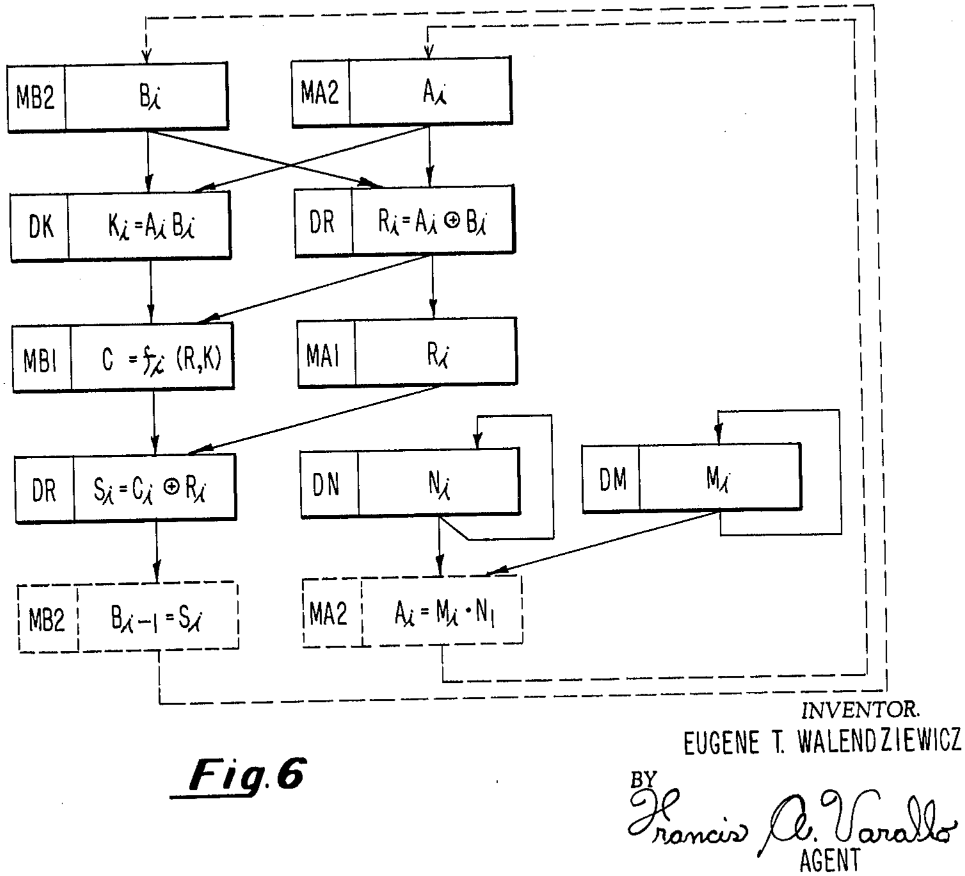
FIG. 6 is a diagrammatic representation of the Method I multiplication process.

FIGURE 6 is a diagrammatic representation of a multiplication process, using the Method I addition arrangement described hereinbefore. The drawing actually represents a point in the midstream of the multiplication, rather than the beginning or the end. Assume that we have the shifted right partial product sum stored in the MB2 matrix register, and the conditioned multiplicand which we are going to add to this partial sum stored in the MA2 matrix register. During the Phase B of the particular clock cycle under consideration the MA2 and MB2 matrix registers are reset bringing information down the A and B channels and this is set into the DK and DR data registers where the logical product and the exclusive-OR of the corresponding terms are derived.

During the Phase A of the next clock cycle the two data registers are reset and the carry matrix register MB1 and the DR buffer matrix register MA1 are set. During the Phase B of this clock cycle the MA1 and the MB1 matrix registers are reset and the exclusive-OR or sum is derived in the DR data register.

In the Phase A of the third cycle being discussed now, the DR data register containing the $S_i$ terms is reset and the information is shifted right and buffered in a matrix-type register MB2. At the same time the multiplicand data register DM, this is a new data register required for multiplication, is cleared as well as the multiplier data register DN, and a special matrix-type register MA2 is set. This register performs a logical product of the least significant bit remaining of the multiplier, $N_1$, with all the terms of the multiplicand $M_i$. The result is that the next word which is added to the partial product sum will be a zero if the multiplier bit is a zero, or it will be equal to the multiplicand if the multiplier bit is a one. Dotted lines are used for these last two registers as they are the same as the MA2 and MB2 matrix register first discussed at the beginning of this operation. The result is that an addition and shift can be performed every two clock periods and multiplication of twenty-four bit numbers (including sign) would be accomplished in 46 clock cycles, plus additional cycles for checking of sign, set-up, and adjusting of sign at the end of the multiplication operation.

Figure 7:
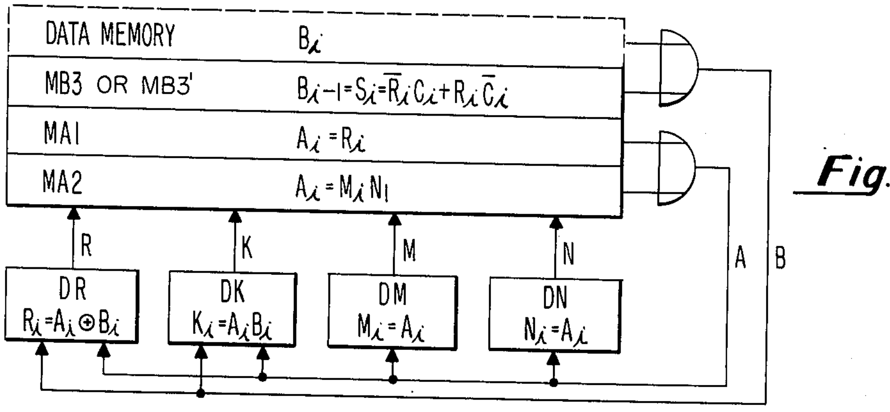
FIG. 7 depicts another system organization of components for an arithmetic unit, and is designated Method II.
Figure 9:
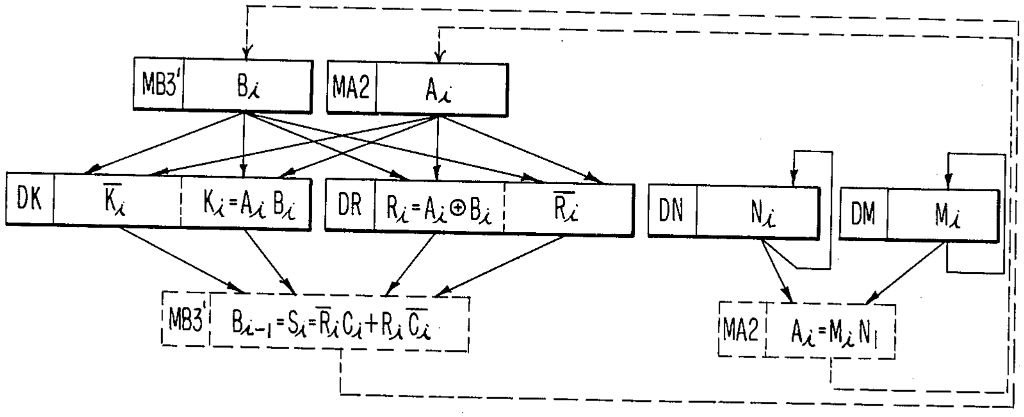
FIG. 9 represents the multiplication operation of Method II.

FIGURE 7 is a block diagram of an arithmetic unit for performing operations in accordance with the present invention but differing from the Method I operations described previously. The system diagram of FIG. 7 and the addition and multiplication charts of FIGS. 8 and 9 respectively, are identified by the notation "Method II." The MB1 carry matrix register of Method I is replaced by a MB3 register in which the final sum is derived through the use of the inclusive-OR operation, using sense lines as mixers, in the following manner:

$$S_i = R_i\overline{C}_i + \overline{R}_iC_i$$

in which $C_i$ is defined by Equation (11b) and $\overline{C}_i$ is given by:

$$\overline{C}_i = \overline{K}_0\overline{R}_0R_1R_2 \ldots R_{i-1} + \overline{K}_1\overline{R}_1R_2R_3 \ldots R_{i-1} + \ldots + \overline{K}_{i-1}\overline{R}_{i-1}$$

This operation requires double the number of core null decoders used in the carry matrix register MB1 of Method I, as well as the $\overline{K}_i$ and $\overline{R}_i$ sections of the DK and DR data registers which are not utilized in the Method I operation. The advantage in Method II operations is that additions can be performed at the rate of one per cycle which represents a significant increase in the speed of a multiplication process.

Figure 8:
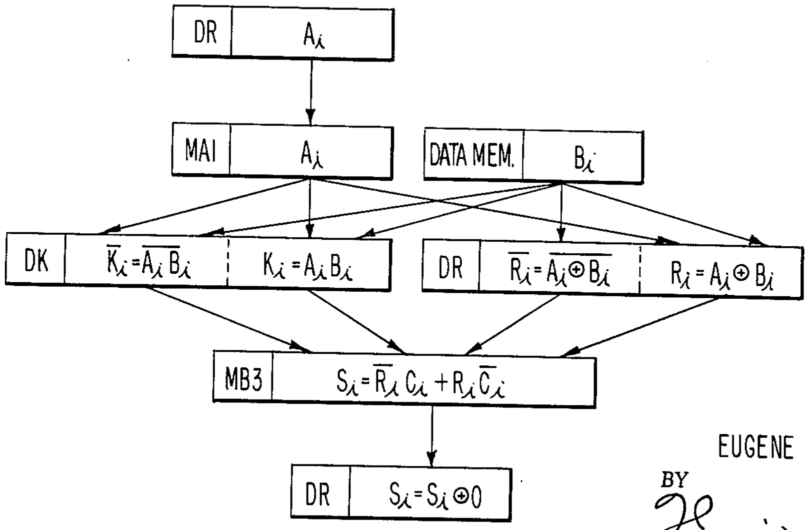
FIG. 8 illustrates the addition process of Method II.

With reference to FIG. 8, the details of the addition operation are as follows: Initially the addend terms $A_i$ are in the DR data register. At Phase A of clock cycle 1 the DR data register is reset and the matrix buffer register MA1 is set. At the same time the augend terms $B_i$ are addressed in the data memory. During Phase B of the first clock cycle the MA1 buffer register and the data memory location $B_i$ are cleared. As the information comes down the channels, the DK and DR data registers, which include the $\overline{K}_i$ and $\overline{R}_i$ data sections are set. These last two sections of the DR register are necessary to generate the sum in the matrix register by this particular operation.

During Phase A of the second clock cycle the DR and DK data registers are cleared and the sum is generated in the MB3 matrix register. The $C_i$ simultaneous-carry equations are a function only of R and K terms, but the $\overline{C}_i$ equations require R, $\overline{R}$, K and $\overline{K}$ terms. In Phase B of the second clock cycle, the sum $S_i$ is brought down out of the matrix registers into the data register DR.

In the operation of multiplication by Method II (see FIG. 9), again starting in the mid-stream of the multiplication scheme, the partial product-sum is stored in the MB3 matrix register, and the new augend, $M_iN_1$, is stored in the MA2 matrix register. During Phase B of that clock cycle, these two matrix registers are cleared and the DR and DK data registers, including the $\overline{K}_i$ and $\overline{R}_i$ sections thereof are set.

During Phase A of the next clock cycle, these data registers are cleared and a sum matrix register $MB_3$, properly shifted as indicated by the subscript $i$–1, is set. At this time $N_1$, the least significant bit of the multiplier data register DN, and $M_i$ or multiplicand register DM are cleared, and the new augend $M_iN_1$, to the partial product sum is generated in the MA2 matrix register. The dotted lines indicate that these last registers are the same as the initial two MA2 and MB3 matrix registers. This multiplication scheme performs an addition every clock cycle, with additional clock cycles for justification of sign and complementing of the final product as necessary. It also requires two sense amplifier channels, as in the case of Method I, both being unipolar, and introduces the need for two new sections for the DR and DK data registers and their inhibit drivers, as well as twice the number of cores for performing the simultaneous carry function. On the other hand, multiplication by Method II is almost twice as fast as by Method I.

Figure 10:
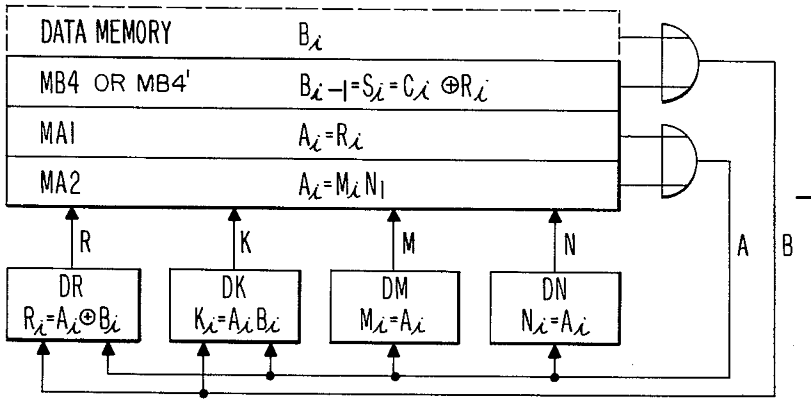
FIG. 10 represents a third variation of arithmetic unit organization and is designated Method III.
Figure 12:
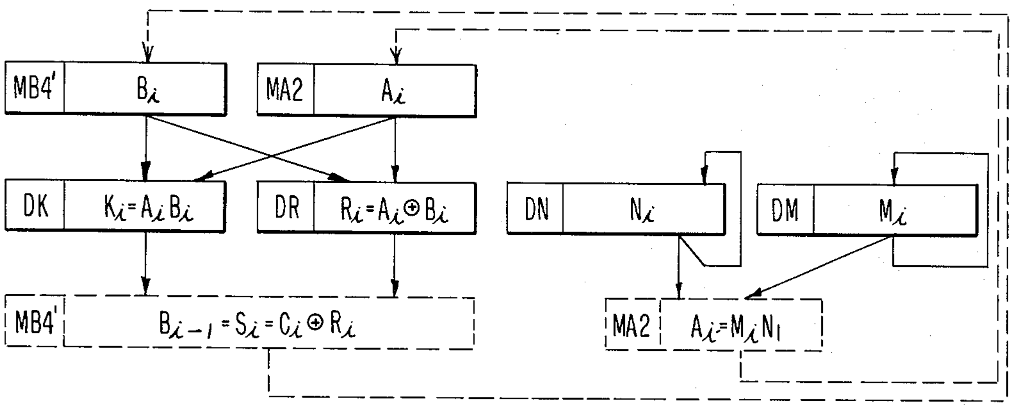
FIG. 12 illustrates binary multiplication by the Method III variation of the magnetic logic techniques of the present invention.
Figure 11:
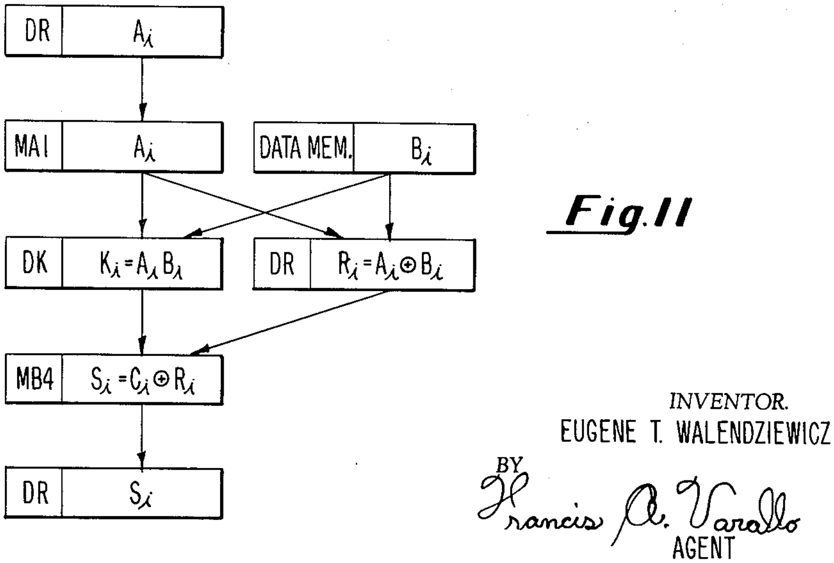
FIG. 11 is a diagram of the addition operation in accordance with Method III.

FIGURES 10, 11 and 12 depict in block form another variation of arithmetic operations based on the magnetic techniques of the present invention. This variation is designated Method III. In the system arrangement of FIG. 10 a new matrix register identified as MB4 is introduced. This register is capable of generating the sum $S_i$ as a function of an exclusive-OR operation performed on the $C_i$ and $R_i$ terms.

The Method III addition process depicted in FIG. 11 uses far fewer components and is just as fast as Method II. The unique feature of this Method results from the logical use of bi-polar sense amplifiers. This allows the the performance of a simple, exclusive-OR between two cores in the matrix register. In particular, as a consequence of the definitions of $R_i$ and $K_i$, it is never possible for more than one core in a single simultaneous carry equation to be set at one time. Now if other cores buffering the $R_i$ terms have been set, and the sense line threads all the decoder cores for the tenth carry equation, $C_{10}$, from one direction, for example, the left, while it threads the $R_{10}$ core from the right, then an exclusive-OR is obtained in that if both cores are set, or neither core, the sense line has a net zero signal on it, and the sense amplifier provides a "0" output. But if the $R_{10}$ core and none of the $C_{10}$ cores is set, or similarly if one of the $C_{10}$ cores is set and not the $R_{10}$ core, then the sense amplifier provides a "1" ouput.

The detailed addition operation is as follows: initially the addend $A_i$ is in the DR data register, and the augend is in memory. During Phase A of the first clock cycle the data register is cleared and the information buffered in th MA1 matrix register. At the same time the data memory is addressed. During Phase B of the first clock period the MA1 buffer matrix register and the data memory are cleared. While the information comes down the two channels the DK and DR data registers are set, performing the simple logic operations on the information presented.

During Phase A of the second clock period the DK and DR data registers are cleared and a sum matrix register, MB4, depicted by the block where $S_i = C_i \oplus R_i$, is set. In Phase B of the second clock cycle this matrix register is cleared and the sum transferred from the matrix register down to the DR data register, where it is essentially exclusive-OR-ed against zeros coming down the other channel resulting in just an identity storage function. While it still takes four transfer times for this addition, method time is not being lost since in a practical system at least four transfer times are required for sequential access to the data and instruction memories. The advantage of Method III techniques are realized during multiplication.

For multiplication by Method III, FIG. 12 graphically depicts the operation. Again starting in mid-stream, the shifted partial product sum is stored in the MB4 matrix register, and the next augend in the MA2 matrix register. During Phase B of this clock cycle both matrix registers are cleared, the information flows down the A and B channels and into the DK and DR data registers where the simple logical product and logical exclusive-OR are performed.

At Phase A of the next clock cycle, the DK and DR data registers are cleared and the sum is generated in a matrix register MB4, properly shifted right as indicated by the "$i$–1" subscript. During the same time the multiplicand $M_i$ data register DM, and the least significant bit $N_1$ of the multiplier data register DN, are cleared and the next augend for the partial products sum is generated in MA2. These blocks are dotted because they are identically the same as the initial MA2 and MB4 matrix registers at the beginning of the operation.

An addition and shift in this arrangement is performed each two transfer times, or ten microseconds at a one hundred kilocycle clock rate, and a full multiplication can be accomplished in twenty-four clock cycles plus additional cycles for justification of sign and testing at the beginning and end of the operation. Thus Method III is very fast, logically, and uses relatively few components. Additionally it should be noted that in this case the $\overline{K}_i$ or the $\overline{R}_i$ sections of the DK and DR data registers are not required as had been the case with the high speed addition and multiplication by Method II. Similarly the MB4 matrix register requires only half the number of cores required for the sum matrix register MB3 in Method II.

From the foregoing description of the invention and its implementation in exemplary arithmetic systems, it is evident that the present techniques are well suited for performing complex logic functions. While there have been illustrated and described the fundamental novel features of the invention as applied to representative embodiments, it should be understood that the invention is not to be considered so limited. For example, it is completely feasible that storage devices other than magnetic cores may advantageously be employed in the practice of the present invention without departing from the true spirit and scope of the invention. Other modifications of the arrangements described herein may be required to fit particular operating requirements. These will be apparent to those skilled in the art. Accordingly, all such variations as are in accord with the principles discussed previously are meant to fall within the scope of the appended claims.

What is claimed is:

1. A system for performing a fully parallel binary addition wherein the simultaneous-carry information is derived from equations of the general form:

$$C_i = K_0R_1R_2 \ldots R_{i-1} + K_1R_2R_3 \ldots R_{i-1} + \ldots + K_{i-1}$$

comprising:

first and second logical data registers, each of said data registers comprising a plurality of stages, one for each order of significance in the binary numbers to be added, said first data register generating $\overline{R}_i$ bits of binary information which are the inverse of the $R_i$ factors appearing in the decoder terms of said equations and represent the inverse exclusive-OR of corresponding bits of information appearing respectively on two input channels, said second data register generating $\overline{K}_i$ bits of binary information which are the inverse of the $K_i$ factors appearing in the decoder terms of said equations and represent the inverse AND function of corresponding bits of information appearing respectively on said input channels, first and second logical matrix registers, said first matrix register generating the simultaneous-carry terms for the addition process in accordance with said set of equations for such terms, said first matrix register comprising, a first plurality of magnetic elements each having a substantially rectangular hysteresis loop characteristic and being capable of assuming opposed states of magnetic flux remanence, each said magnetic element representing a single decoder term of said equations, said second matrix register accepting and buffering the information stored in said first data register and comprising a second plurality of magnetic elements equal in number and corresponding to the stages of said first data register, inhibit lines representative of the inverse of the input variables appearing as the factors of the decoder terms of said simultaneous-carry equations, said inhibit lines corresponding to the factors of any given decoder term and being inductively coupled to the element of said first plurality of magnetic elements representing said given term, those inhibit lines corresponding also to the inverse input variables generated by said first data register being inductively coupled as well to respective ones of said second plurality of magnetic elements, said inhibit lines being adapted to be pulsed from a source of current in accordance with the binary information stored in both said first and second data registers, a plurality of control lines coupled to said first and second pluralities of magnetic elements, said control lines being adapted to be pulsed selectively from a source of current whereby selected magnetic elements tend to be switched from one state of remanence to the opposite state of remanence, a first plurality of sense lines representative respectively of said mathematical equations, each said sense line being inductively coupled in common to all of the magnetic elements in said first matrix register which represent decoder terms in a given one of said equations, a second plurality of sense lines inductively coupled respectively to said second plurality of magnetic elements, the switching of the magnetic elements of said first and second matrix registers causing output voltages to be induced in the sense lines coupled to said magnetic elements, the output voltages induced respectively on the sense lines associated with said first and second matrix registers appearing as bits of information on said two input channels, and means for applying said bits of carry information in common to both said first and second data registers.

2. The system as defined in claim 1 wherein said plurality of control lines comprises:

a separate set line inductively coupled respectively to said first and second pluralities of magnetic elements, said set lines being adapted to be pulsed selectively at a predetermined time from a source of current whereby the magnetic elements coupled thereto tend to be switched toward the first of said states of magnetic remanence, a reset line inductively coupled to all said magnetic elements, said reset line being adapted to be pulsed from a source of current whereby all said magnetic elements tend to be driven toward the second of said states of magnetic remanence, means for energizing concurrently at said predetermined time a selected set line and certain inhibit lines as determined by the information stored in said data registers, the flow of current through said last inhibit lines preventing the switching of the magnetic elements coupled thereto, the absence of said current flow in the non-energized inhibit lines at said predetermined time allowing the magnetic elements to which said non-energized lines are coupled to be switched toward said first state in response to current flow through the set lines coupled to said last elements.

3. The system as defined in claim 1 further adapted to perform a binary multiplication by the process of iterative addition comprising:

a third and a fourth logical data register, said third data register storing the bits of binary information representing the multiplicand and being capable of restoring said information after each read-out of the multiplicand, said fourth data register storing the bits of binary information representing the multiplier and being capable of restoring and shifting said information one bit position to the right after each read-out of the multiplier, a third and a fourth logical matrix register, means for reading out the information stored in both said third and fourth data registers and applying such information concurrently to said third matrix register, said third matrix register performing a logical product of the least significant bit remaining of the multiplier information from said fourth data register with all the bits of the multiplicand information from said third data register, said third matrix register thereby storing said conditioned multiplicand, means for reading out the partial product sum information stored in said first data register and applying such information to said fourth matrix register, said fourth matrix register accepting and buffering such information and providing a shift to the right of one bit position, said fourth matrix register thereby storing said shifted partial product sum, means for transferring the bits of said partial product sum and said conditioned multiplicand from said third and fourth matrix registers respectively to the corresponding stages of both said first and second data registers.

4. A system for performing a fully parallel binary addition wherein the simultaneous-carry information is derived from the equations of the general form:

$$C_i = K_0R_1R_2 \ldots R_{i-1} + K_1R_2R_3 \ldots R_{i-1} + \ldots + K_{i-1}$$

comprising:

first and second logical data registers, each of said data registers comprising a plurality of stages, one stage for each order of significance in the binary numbers to be added, said first data register performing an inverse exclusive-OR operation of the addend and augend terms appearing respectively on two input information channels coupled thereto, thereby generating the $\overline{R}_i$ function vectors which are the inverse of the $R_i$ factors appearing in the decoder terms of said equations, said second data register performing an inverse AND function of said addend and augend terms appearing respectively on said input channels coupled thereto, thereby generating the $\overline{K}_i$ function vectors which are the inverse of the $K_i$ factors appearing in the decoder terms of said equations, first and second logical matrix registers, said first matrix register comprising a first plurality of magnetic elements each having a substantially rectangular hysteresis loop characteristic and being capable of assuming opposed states of magnetic flux remanence, each said magnetic element representing a single decoder term of said equations, said second matrix register comprising a second plurality of magnetic elements equal in number and corresponding to the stages of said first data register, means for transferring the $\overline{R}_i$ function vectors generated in said first data register concurrently to both said first and second logical matrix registers, and simultaneously transferring said $\overline{K}_i$ function vectors generated in said second data register to said first matrix register, said first matrix register performing a simultaneous carry operation upon the $\overline{R}_i$ and $\overline{K}_i$ function vectors transferred thereto, thereby generating the $C_i$ carry vectors in accordance with said equations, said second matrix register accepting and buffering the $\overline{R}_i$ function vectors transferred thereto and converting the latter to $R_i$ vectors, means for transferring the $C_i$ and $R_i$ function vectors respectively from said first and second matrix registers into said first data register, said first data register performing an inverse exclusive-OR operation upon said $C_i$ and $R_i$ function vectors, thereby generating the sum of said addend and augend terms.

5. The system as defined in claim 4 wherein said first logical matrix register for implementing the set of simultaneous-carry equations derived from the general form of the equation:

$$C_i = K_0R_1R_2 \ldots R_{i-1} + K_1R_2R_3 \ldots R_{i-1} + \ldots + K_{i-1}$$

comprises said first plurality of magnetic elements and is further characterized in that:

said means for transferring the $\overline{R}_i$ and $\overline{K}_i$ function vectors generated respectively in said first and second data registers to said first matrix register includes a plurality of inhibit lines representative of the corresponding $K_i$ and $R_i$ factors of the decoder terms of said equations, the inhibit lines corresponding to the factors of any given decoder term being inductively coupled to the magnetic element representing said given term, said lines being adapted to be pulsed selectively from a source of current whereby each magnetic element coupled to an energized inhibit line tends to be switched toward the reset state, first winding means inductively coupled in common to said first plurality of magnetic elements and adapted to be pulsed from a source of current at a predetermined time, whereby said magnetic elements tend to be switched toward the set state, said first winding means and selected inhibit lines being energized concurrently at said predetermined time, the presence of current flow through said selected inhibit lines at said predetermined time inhibiting the switching of the magnetic elements to which said lines are inductively coupled and thereby causing said elements to remain in their original reset state, the absence of current flow in the non-selected inhibit windings at said predetermined time allowing the magnetic elements to which said non-selected lines are coupled to be switched from the reset state to the set state, said means for transferring the $C_i$ function vectors from said first matrix register into said first data register including a plurality of sense windings associated with the $C_i$ carry equations, each of said sense windings being inductively coupled in common to all of the magnetic elements representing decoder terms in a given carry equation thereby effecting an inclusive-OR operation in accordance with the terms of said equation, the switching of a magnetic element at said predetermined time resulting in a voltage induced in the sense winding coupled to said element, said induced voltage representing a bit of carry information derived from the equation associated with said sense winding.

6. The system as defined in claim 4 further adapted to perform a binary multiplication by the process of iterative addition comprising:

a third and a fourth logical data register, said third data register storing the bits of binary information representing the multiplicand and being capable of restoring said information after each read-out of the multiplicand, said fourth data register storing the bits of binary information representing the multiplier and being capable of restoring and shifting said information one bit position to the right after each read-out of the multiplier, a third and a fourth logical matrix register, means for reading out the information stored in both said third and fourth data registers and applying such information concurrently to said third matrix register, said third matrix register performing an AND operation on the least significant bit remaining of the multiplier information from said fourth data register with all the bits of the multiplicand information from said third data register, said third matrix register thereby storing said conditioned multiplicand, means for reading out the partial product sum information stored in said first data register and applying such information to said fourth matrix register, said fourth matrix register accepting and buffering such information and providing a shift to the right of one bit position, said fourth matrix register thereby storing said shifted partial product sum, means for transferring the bits of said partial product sum and said conditioned multiplicand from said third and fourth matrix registers respectively to the corresponding stages of both said first and second data registers.

7. A system for performing a full parallel binary addition wherein the simultaneous carry information is derived from the equations of the general form:

$$C_i = K_0R_1R_2 \ldots R_{i-1} + K_1R_2R_3 \ldots R_{i-1} + \ldots + K_{i-1}$$

and where $\overline{C}_i$ is the inverse of $C_i$ and is expressed by:

$$\overline{C}_i = \overline{K}_0\overline{R}_0R_1R_2 \ldots R_{i-1} + \overline{K}_1\overline{R}_1R_2R_3 \ldots R_{i-1} + \ldots + \overline{K}_{i-1}\overline{R}_{i-1}$$

and where the set of equations derived from the expression for the sum $S_i$ is:

$$S_i = \overline{R}_iC_i + R_i\overline{C}_i$$

comprising:

first and second logical data registers, each of said data registers comprising two sections representative respectively of a function and the negation of said function, each of said data registers comprising a plurality of stages, one stage for each order of significance in the binary numbers to be added, said first data register performing an exclusive-OR and an inverse exclusive-OR operation on the addend and augend terms appearing respectively on two input information channels coupled thereto, thereby generating in said respective sections of said first data register the $R_i$ and $\overline{R}_i$ function vectors which corresponds to the factors appearing in the terms of said equations, said second data register performing an AND and an inverse AND operation on said addend and augend terms appearing respectively on said input information channels coupled thereto, thereby generating in said respective sections of said second data register the $K_i$ and $\overline{K}_i$ function vectors which correspond to the factors appearing in the terms of said equations, a logical matrix register comprising a plurality of magnetic elements each having a substantially rectangular hysteresis loop characteristic and being capable of assuming opposed states of magnetic flux remanence, each said magnetic element representing a single term of said equations, means for transferring the $R_i$ and $\overline{R}_i$, and $K_i$ and $\overline{K}_i$ function vectors generated respectively in said first and second data registers to said logical matrix register, said last register generating the $S_i$ sum vector in accordance with said sum equation, and means for transferring said $S_i$ sum vector from said logical matrix register to said first data register.

8. The system as defined in claim 7 wherein said logical matrix register for implementing the set of equations derived from the expression for the sum, $S_i$:

$$S_i = \overline{R}_iC_i + R_i\overline{C}_i$$

comprises said plurality of magnetic elements and is further characterized in that:

said means for transferring the $R_i$ and $\overline{R}_i$, and $K_i$ and $\overline{K}_i$ function vectors generated respectively in said first and second data registers to said logical matrix register includes a plurality of inhibit lines representative of the input variables expressed by the $R_i$, $\overline{R}_i$ and $K_i$, $\overline{K}_i$ factors of the decoder terms of said $C_i$ and $\overline{C}_i$ equations, the inhibit lines corresponding to the factors of any given decoder term being inductively coupled to the magnetic element representing said given term, said inhibit lines being adapted to be pulsed selectively from a source of current whereby each magnetic element coupled to an energized inhibit line tends to be switched toward the reset state, first winding means inductively coupled to said magnetic elements and adapted to be pulsed from a source of current at a predetermined time, whereby said magnetic elements tend to be switched toward the set state, said first winding means and selected inhibit lines being energized concurrently at said predetermined time, the presence of current flow through said selected inhibit lines at said predetermined time inhibiting the switching of the magnetic elements to which said lines are inductively coupled and thereby causing said elements to remain in their original reset state, the absence of current flow in the non-selected inhibit windings at said predetermined time allowing the magnetic elements to which said non-selected lines are coupled to be switched from the reset state to the set state, said means for transferring said $S_i$ sum vector from said logical matrix register to said first data register including a plurality of sense windings associated respectively with the $S_i$ sum equations, each of said sense windings being inductively coupled in common to all of the magnetic elements representing decoder terms in a given sum equation and thereby effecting the inclusive-OR operation of the terms of said equation, the switching of a magnetic element at said predetermined time resulting in a voltage induced in the sense winding coupled to said element, said induced voltage representing the sum information derived from the equation associated with said sense winding.

9. The system as defined in claim 7 further adapted to perfom a binary multiplication by the process of iterative addition comprising:

a third and a fourth logical data register, said third data register storing the bits of binary information representing the multiplicand and being capable of restoring said information after each readout of the multiplicand, said fourth data register storing the bits of binary information representing the multiplier and being capable of restoring and shifting said information one bit position to the right after each read-out of the multiplier, a second and a third logical matrix register, means for reading out the information stored in both said third and fourth data registers and applying such information concurrently to said second matrix register, said second matrix register performing an AND operation on the least significant bit remaining of the multiplier information from said fourth data register with all the bits of the multiplicand information from said third data register, said second matrix register thereby storing said conditioned multiplicand.

said third matrix register storing the initial partial product sum shifted to the right by one bit position, means for transferring said conditioned multiplicand and said intial shifted partial product sum from said second and third matrix registers respectively to the corresponding stages of both said first and second data registers, means for transferring the information from said first and second data registers to said third matrix register, thereby resulting in the generation within said third matrix register of a new partial product sum shifted to the right by one bit position.

10. A system for performing a fully parallel binary addition wherein the simultaneous carry information is derived from the equations of the general form:

$$C_i = K_0R_1R_2 \ldots R_{i-1} + K_1R_2R_3 \ldots R_{i-1} + \ldots + K_{i-1}$$

and where the set of equations derived from the expression for the sum, $S_i$ is:

$$S_i = C_i \oplus R_i$$

comprising:

first and second logical data registers, each of said data registers comprising a plurality of stages, one stage for each order of significance in the binary numbers to be added, said first data register performing an inverse exclusive-OR operation of the addend and augend terms appearing respectively on two input information channels coupled thereto, thereby generating the $\overline{R}_i$ function vectors which are the inverse of the $R_i$ factors appearing in the decoder terms of said equations, said second data register performing an inverse AND function of said addend and augend terms appearing respectively on said input channels coupled thereto, thereby generating the $\overline{K}_i$ function vectors which are the inverse of the $K_i$ factors appearing in the decoder terms of said equations, a logical matrix register comprising a plurality of magnetic elements each having a substantially rectangular hysteresis loop characteristic and being capable of assuming opposed states of magnetic flux remanence, each said magnetic element representing a single term of said equations, means for transferring the $\overline{R}_i$ and $\overline{K}_i$ function vectors generated respectively in said first and second data registers to said logical matrix register, said last register generating the $S_i$ sum vector in accordance with said sum equation, and means for transferring said $S_i$ sum vector from said logical matrix register to said first data register.

11. The system as defined in claim 10 wherein said logical matrix register for implementing the set of equations derived from the expression for the sum, $S_i$:

$$S_i = C_i \oplus R_i$$

comprises said plurality of magnetic elements and is further characterized in that:

said means for transferring the $\overline{R}_i$ and $\overline{K}_i$ function vectors generated respectively in said first and second data registers to said logical matrix register includes a plurality of inhibit lines representative of the input variables expressed by the corresponding $K_i$ and $R_i$ factors of the decoder terms of said equations, the inhibit lines corresponding to the factors of any given decoder term being inductively coupled to the magnetic element representing said given term, said inhibit lines being adapted to be pulsed selectively from a source of current whereby each magnetic element coupled to an energized inhibit line tends to be switched toward the reset state, first winding means inductively coupled to said magnetic elements and adapted to be pulsed from a source of current at a predetermined time, whereby said magnetic elements tend to be switched toward the set state, said first winding means and selected inhibit lines being energized concurrently at said predetermined time, the presence of current flow through said selected inhibit lines at said predetermined time inhibiting the switching of the magnetic elements to which said lines are inductively coupled and thereby causing said elements to remain in their original reset state, the absence of current flow in the nonselected inhibit windings at said predetermined time allowing the magnetic elements to which said nonselected lines are coupled to be switched from the reset state to the set state, said means for transferring said $S_i$ sum vector from said logical matrix register to said first data register including a plurality of sense windings associated with the $S_i$ sum equations, each of said sense windings being inductively coupled in common to all of the magnetic elements representing decoder terms in a given $S_i$ carry equation and threading such elements in a first direction, each of said sense windings also being inductively coupled to the magnetic elements representing the $R_i$ decoder terms and threading these last elements from the opposite direction, thereby effecting the exclusive-OR operation of the terms of said sum equation, the switching of a magnetic element at said predetermined time resulting in a voltage induced in the sense winding coupled to said element, said induced voltage representing the sum information derived from the equation associated with said sense winding.

12. The system as defined in claim 10 further adapted to perform a binary multiplication by the process of iterative addition comprising:

a third and a fourth logical data register, said third data register storing the bits of binary information representing the multiplicand and being capable of restoring said information after each read-out of the multiplicand, said fourth data register storing the bits of binary information representing the multiplier and being capable of restoring and shifting said information one bit position to the right after each read-out of the multiplier, a second and a third logical matrix register, means for reading out the information stored in both said third and fourth data registers and applying such information concurrently to said second matrix register, said second matrix register performing an AND operation on the least significant bit remaining of the multiplier information from said fourth data register with all the bits of the multiplicand information from said third data register, said second matrix register thereby storing said conditioned multiplicand, said third matrix register storing the initial partial product shifted to the right by one bit position, means for transferring said conditioned multiplicand and said initial shifted partial product sum from said second and third matrix registers respectively to the corresponding stages of both said first and second data registers, means for transferring the information from said first and second data registers to said third matrix register, thereby resulting in the generation within said third matrix register of a new partial product sum shifted to the right by one bit position.

References Cited by the Examiner

UNITED STATES PATENTS

| | | | |
|---|---|---|---|
| 2,734,182 | 2/1956 | Rajchman | 235—164 |
| 2,734,187 | 2/1956 | Rajchman | 235—164 |
| 2,778,006 | 1/1957 | Guterman | 235—173 |
| 2,784,390 | 3/1957 | Chien | 235—164 |

ROBERT C. BAILEY, *Primary Examiner.*

MALCOLM A. MORRISON, *Examiner.*